(12) United States Patent
Seger

(10) Patent No.: US 8,573,137 B2
(45) Date of Patent: *Nov. 5, 2013

(54) REINFORCED PLASTIC PALLET AND METHOD OF MAKING

(76) Inventor: Anthony C. Seger, Sidney, OH (US)

( * ) Notice: Subject to any disclaimer, the term of this patent is extended or adjusted under 35 U.S.C. 154(b) by 291 days.

This patent is subject to a terminal disclaimer.

(21) Appl. No.: 12/657,414

(22) Filed: Jan. 20, 2010

(65) Prior Publication Data

US 2011/0174198 A1 Jul. 21, 2011

(51) Int. Cl.
*B65D 19/38* (2006.01)

(52) U.S. Cl.
USPC .................................. 108/57.27; 108/901

(58) Field of Classification Search
USPC ............ 108/57.33, 57.25–57.28, 51.11, 901
See application file for complete search history.

(56) References Cited

U.S. PATENT DOCUMENTS

| | | | | |
|---|---|---|---|---|
| 3,444,034 | A * | 5/1969 | Hewett | 428/72 |
| 3,610,173 | A * | 10/1971 | McIlwraith et al. | 108/56.1 |
| 4,428,306 | A * | 1/1984 | Dresen et al. | 108/53.3 |
| 5,197,396 | A | 3/1993 | Breezer et al. | |
| 5,391,251 | A * | 2/1995 | Shuert | 156/292 |
| 5,401,347 | A * | 3/1995 | Shuert | 156/245 |
| 5,413,052 | A | 5/1995 | Breezer et al. | |
| 5,470,641 | A * | 11/1995 | Shuert | 428/178 |
| 5,676,064 | A | 10/1997 | Shuert | |
| 5,736,221 | A * | 4/1998 | Hardigg et al. | 428/116 |
| 5,794,544 | A * | 8/1998 | Shuert | 108/57.25 |
| 5,813,355 | A | 9/1998 | Brown et al. | |
| 5,845,588 | A | 12/1998 | Gronnevik | |
| 5,950,545 | A * | 9/1999 | Shuert | 108/53.3 |
| 6,389,990 | B1 | 5/2002 | Apps | |
| 6,749,418 | B2 | 6/2004 | Muirhead | |
| 6,807,911 | B2 | 10/2004 | Carson et al. | |
| 6,826,887 | B2 | 12/2004 | Skov | |
| 6,840,181 | B2 | 1/2005 | Smyers | |
| 6,962,115 | B2 | 11/2005 | Markling et al. | |
| 6,976,437 | B2 | 12/2005 | Fisch et al. | |
| 7,197,989 | B2 | 4/2007 | Apps | |
| 2011/0174197 | A1 * | 7/2011 | Seger | 108/57.25 |

* cited by examiner

*Primary Examiner* — Janet M Wilkens
*Assistant Examiner* — Timothy M Ayres
(74) *Attorney, Agent, or Firm* — Jacox, Meckstroth & Jenkins

(57) ABSTRACT

A hollow upper deck panel for a plastic pallet has a solid top surface and is produced by forming a tubular hot plastic parison and directing the parison between blow mold sections to form upper and lower sheets for the deck panel. The lower sheet is blow molded by pressured air within the parison into a mold section to form spaced inverted U-shaped open ribs projecting upwardly and with top portions fused to the upper sheet. The upper sheet is blow molded by the air around retractable blades to form spaced closed double wall ribs projecting downwardly between the open ribs and have bottom portions fused to the lower sheet. The closed double wall ribs extend transversely to the open ribs and have end portions fused to the open ribs. The support structure for the upper deck panel defines spaces for receiving parallel spaced forks of a forklift truck.

3 Claims, 4 Drawing Sheets

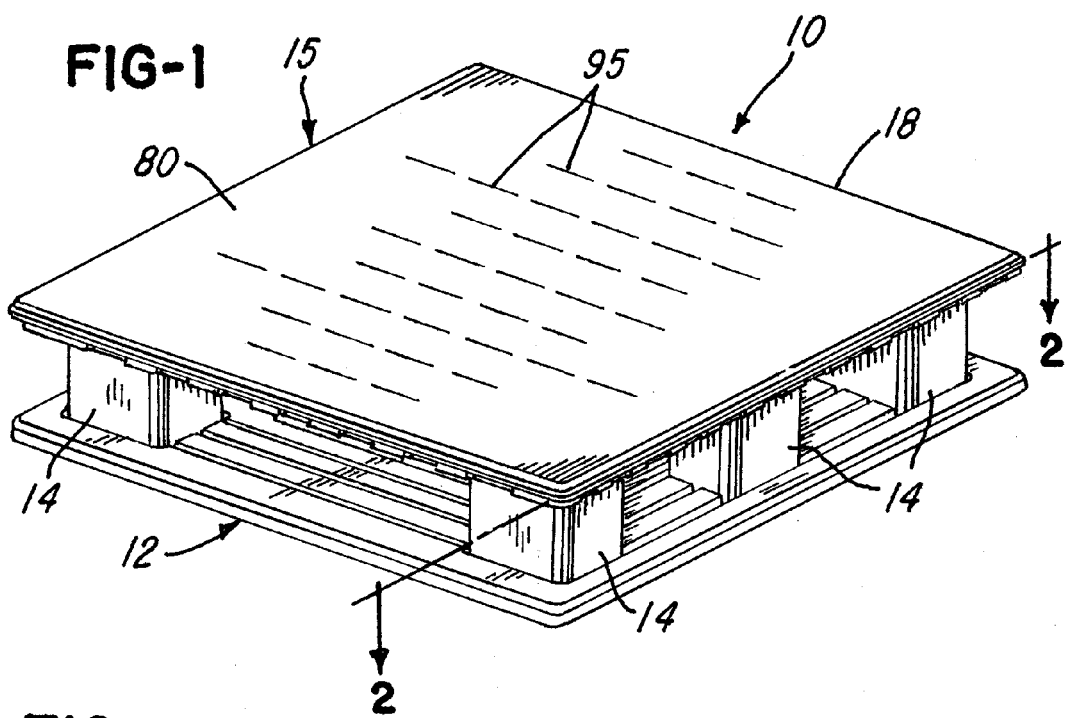
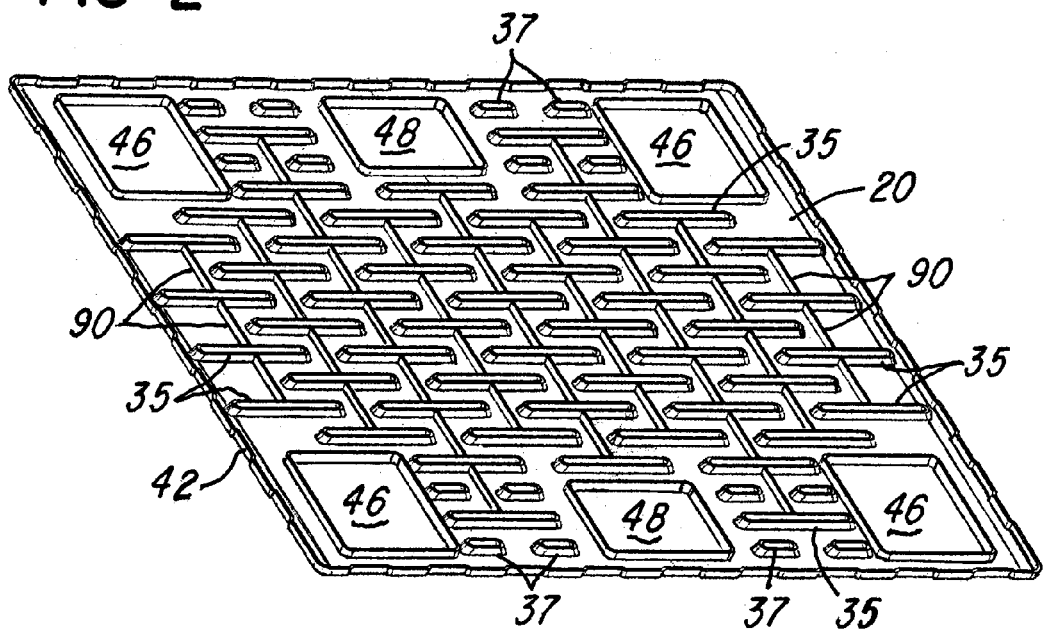

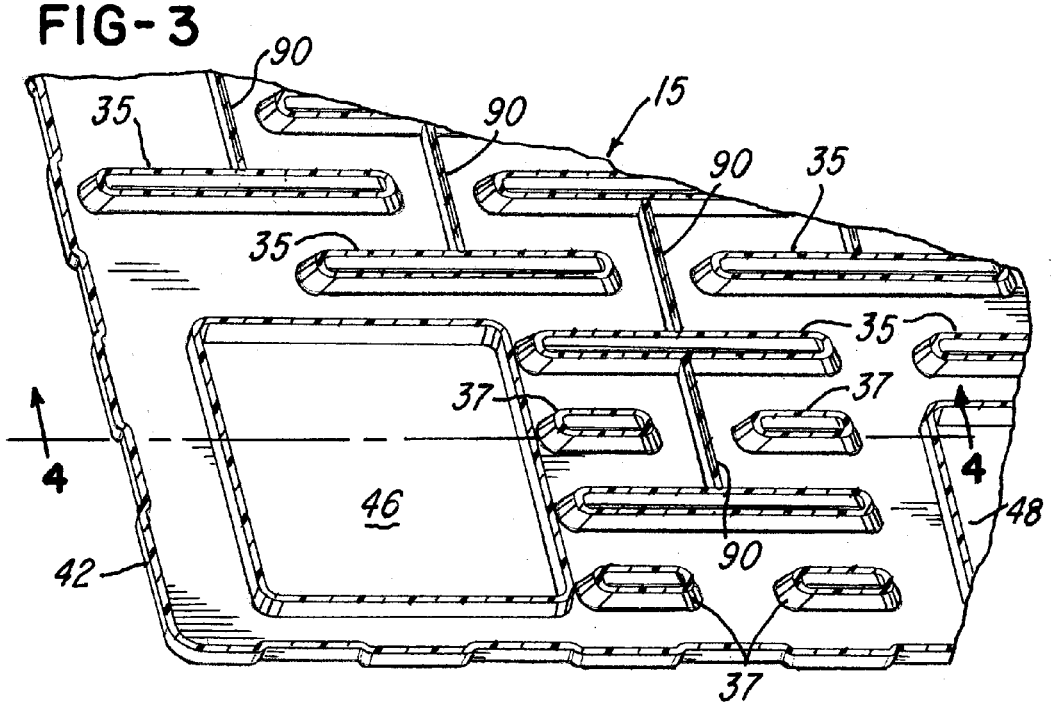
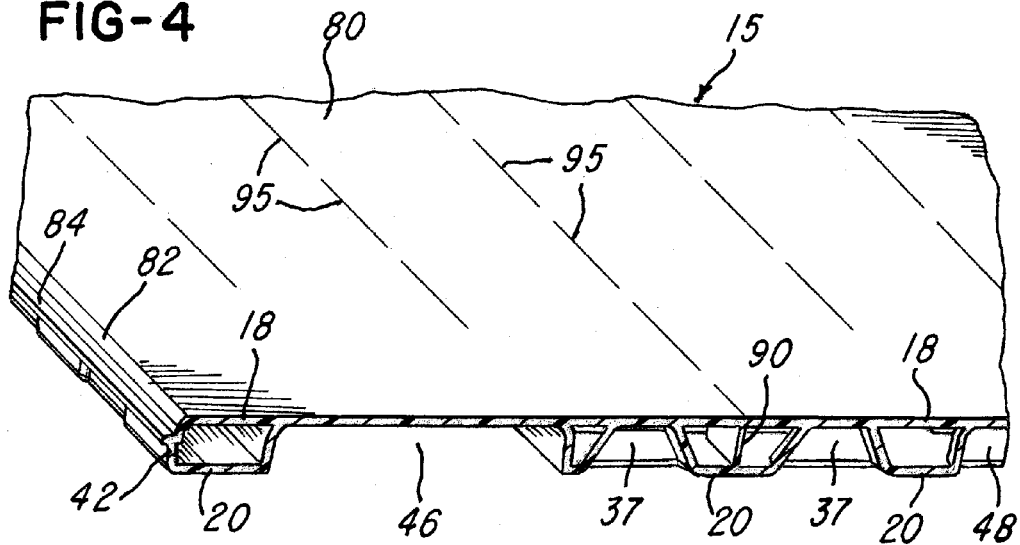

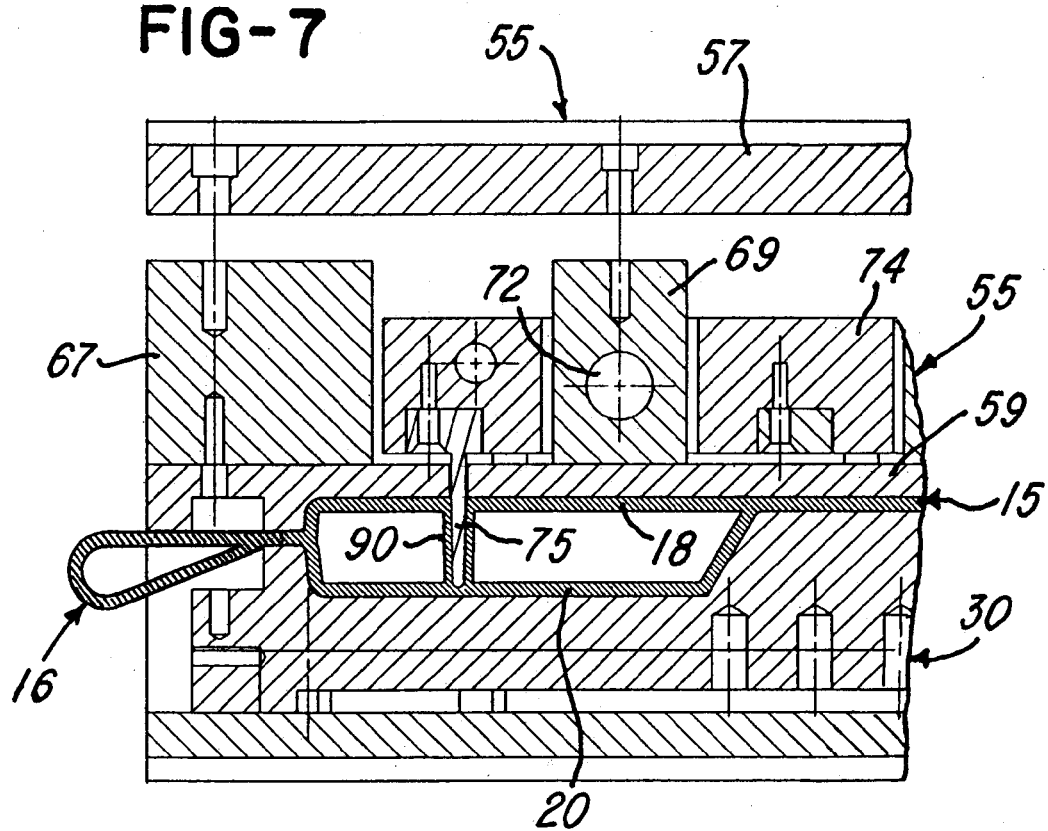
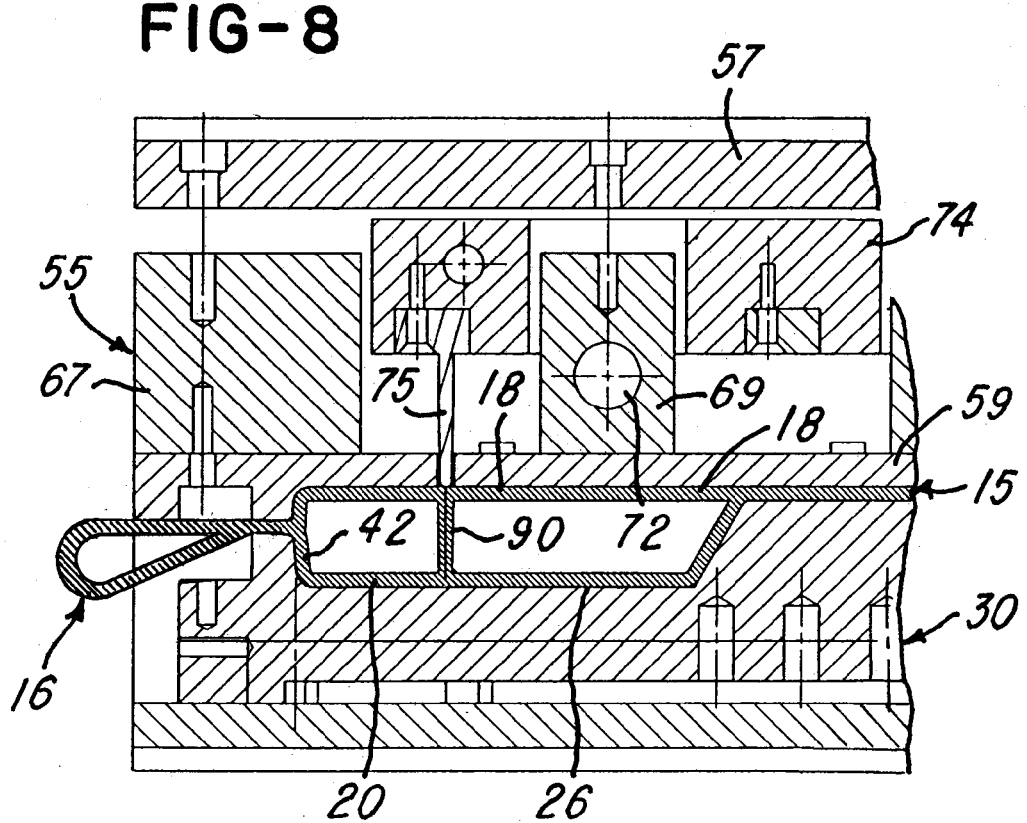

REINFORCED PLASTIC PALLET AND METHOD OF MAKING

BACKGROUND OF THE INVENTION

In the manufacture of large pallets of rigid plastics material and having recesses or spaces for receiving parallel spaced forks of a forklift truck, it is well known to form the pallets with a twin sheet thermoformed upper deck, for example, as disclosed in U.S. Pat. Nos. 5,197,396, 5,413,052, 5,676,064 and 5,813,355. It is also known to make or form upper decks and other components for a plastic pallet by extruding a plastic parison and directing the parison into blow molding equipment, for example, as disclosed in U.S. Pat. Nos. 5,845,588, 6,962,115 and 6,976,437. Blow-molding processes have also been used to form rigid hollow plastic panels, for example, as disclosed in U.S. Pat. No. 6,826,887. Plastic pallets have also been made by using injection molded components, for example, as disclosed in U.S. Pat. Nos. 6,389,990, 6,840,181 and 7,197,989. It is further known to make plastic pallets by rotational molding, for example, as disclosed in U.S. Pat. No. 6,807,911.

In the manufacture of any plastic pallet or hollow plastic panel, it is desirable to maximize the strength/weight ratio while minimizing the cost of manufacturing or producing the pallet or panel. Also, for many uses of a plastic pallet or panel, it is desirable for the top surface to be substantially smooth and solid without openings which can trap or collect undesirable debris or material. When the top deck and the bottom deck of a plastic pallet are vacuum-formed by a twin-sheet thermoforming process, it is also known to insert tubular metal reinforcing members between the sheets, for example, as disclosed in above mentioned U.S. Pat. Nos. 5,197,396 and 5,413,052. The top and bottom decks or panels of a plastic pallet formed by blow molding or by a twin-sheet or triple sheet thermoformed process are also commonly reinforced by forming integral hollow or open ribs in the top and/or bottom sheets, for example, as disclosed in above U.S. Pat. Nos. 5,676,064, 5,813,355 and 6,749,418.

SUMMARY OF THE INVENTION

The present invention is directed to a plastic pallet having a plastic top deck panel incorporating integral rib reinforcement which significantly increases the strength of the deck panel and which also helps to minimize the thicknesses of the plastic sheet material forming the panel. A top deck panel constructed in accordance with the invention also provides the pallet with a solid top surface without any recesses or cavities which can collect dirt and debris.

In accordance with the illustrated embodiment of the invention, a reinforced hollow upper deck panel for a plastic pallet is produced by a blow molding process wherein an extruded tubular parison of thermoplastic material may be directed downwardly from the extruder between opposing open mold sections of blow molding equipment so that the hot parison forms an upper sheet and a lower sheet for the upper pallet deck panel. After the mold sections close to fuse peripheral portions of the upper and lower sheets together, pressurized air within the parison forms the lower sheet into a first mold section to form parallel spaced inverted U-shaped elongated open ribs which project upwardly and have spaced side walls. The upper sheet of thermoplastic material is formed by the pressurized air into a second mold section which has a set of extendable and retractable parallel blades to form parallel spaced elongated closed double wall ribs projecting downwardly from the upper sheet and having adjacent side walls. After the mold sections close on the hot sheets formed by the tubular parison and the parison is pressurized with air and with optional vacuum assist in the mold sections, the top portions of the open ribs in the lower sheet fuse to the upper sheet, and the double wall closed ribs project downwardly between the open ribs and have bottom portions fused to the lower sheet.

While the air pressure continues between the fused together upper and lower sheets and before the sheets solidify, the blades are retracted so that the adjacent walls of the double walled ribs are fused together. The closed double walled ribs extend transversely or perpendicular to the open ribs, and the end portions of the double walled ribs fuse to the side walls of the open ribs, with the result that the hollow plastic upper deck panel is reinforced by the crossing ribs in all directions. The supporting structure for the upper deck panel is also preferably formed of plastics material, and a lower deck panel for the pallet may be formed in the same manner as the upper deck panel.

Other features and advantages of the invention will be apparent from the following description, the accompanying drawings and the appended claims.

BRIEF DESCRIPTION OF THE DRAWINGS

FIG. 1 is a perspective view of a plastic pallet having a reinforced hollow plastic panel constructed in accordance with the invention and forming the upper deck of the pallet;

FIG. 2 is a perspective section of the hollow plastic panel, taken generally on the line 2-2 of FIG. 1;

FIG. 3 is an enlarged perspective fragmentary section of a corner portion of the plastic panel shown in FIG. 2;

FIG. 4 is a fragmentary perspective section of the final blow molded upper deck panel shown in FIG. 1 and taken generally on the line 4-4 of FIG. 3;

FIG. 7 is a larger fragmentary horizontal section of the tooling shown in FIG. 5 with the mold sections in a closed position and a rib forming blade in an extended position; and FIG. 8 is a fragmentary section similar to FIG. 7 and showing the rib forming blade in a retracted position.

DESCRIPTION OF THE PREFERRED EMBODIMENT

Figure 5:
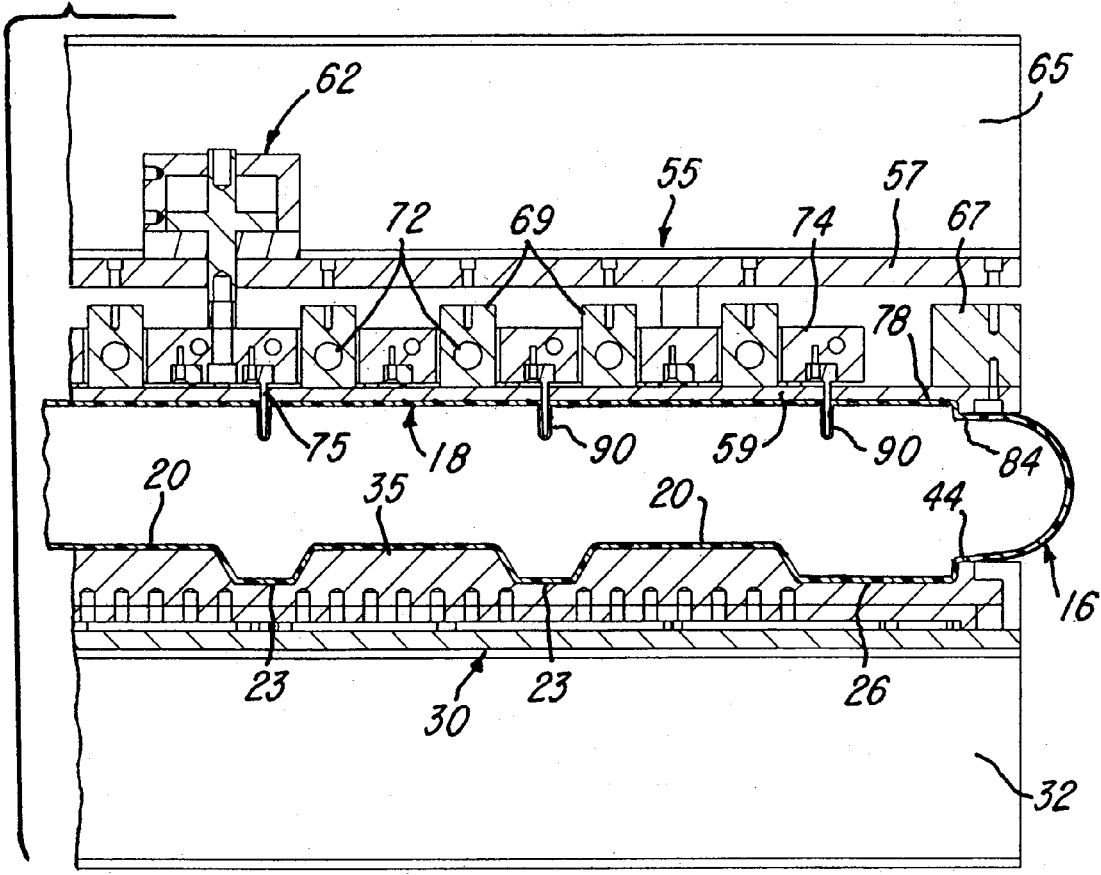
FIG. 5 is a fragmentary horizontal section of blow molding tooling with the mold sections in an open position and a pressurized parison between the mold sections.
Figure 6:
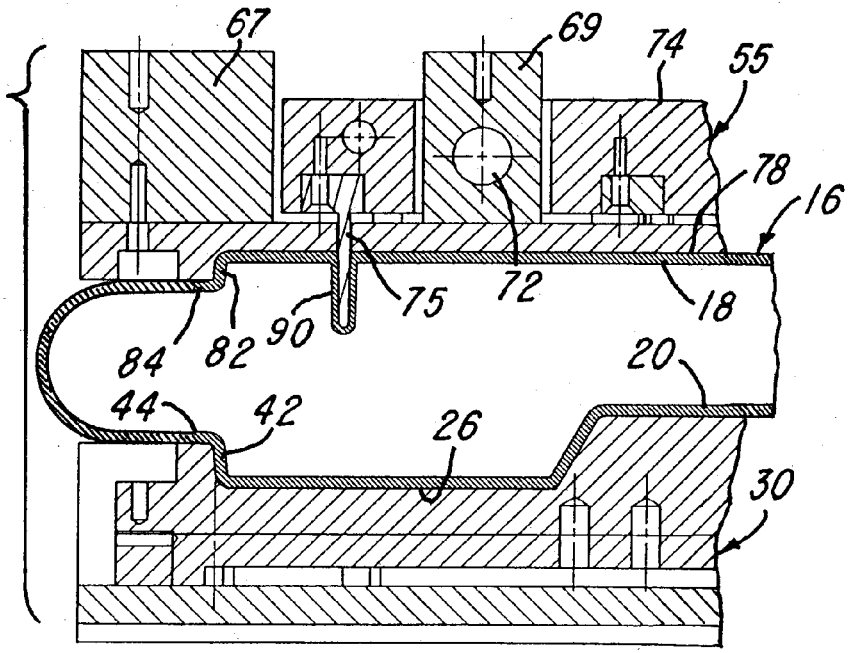
FIG. 6 is a larger fragmentary horizontal section of the tooling shown in FIG. 5.

FIG. 1 illustrates a plastic pallet 10 having a lower deck panel 12 connected by a set of peripherally spaced hollow or tubular legs 14 to a hollow plastic panel 15 constructed in accordance with the invention and forming the upper deck for the pallet 10. As shown in FIGS. 5-8, the hollow upper deck panel 15 is formed by a blow molding method and tooling and equipment. The hollow panel 15 is formed from an extruded tubular or hollow parison 16 (FIG. 5) of heated thermoplastic material and which forms an upper thermoplastic sheet 18 (FIG. 5) and a lower thermoplastic sheet 20 for the upper deck panel 15. The hot parison 16 may be extruded downwardly directly into and between opposing mold sections of blow molding equipment or the parison may be made as a preform and later reheated before entering the blow mold sections. The heated lower sheet 20 is formed by pressurized air within the parison 16 into cavities 23 and 26 within a mold section 30 supported by parallel spaced beams 32. As shown in FIGS. 2 & 3, when the sheet 20 is formed into the cavities 23 and 26 and other cavities within the mold section 30, elongated inverted U-shape bottom open ribs 35 and 37 are formed within the sheet 20 along with a peripherally extending wall 42 (FIG. 6) extending to a peripherally extending and outwardly projecting lip or flange 44. Vacuum assist may also be used in the mold section 30 to aid in forming the open ribs 35 and 37.

The forming of the lower sheet also forms a series of peripherally spaced open bottom cavities 46 and 48 (FIGS. 2-4) within the lower sheet 20, and the cavities receive the upper end portions of the legs 14 when the lower deck panel 12 is later assembled to the upper deck panel 15. The lower deck panel 12 is also formed to have cavities corresponding to the cavities 46 & 48 to receive the lower end portions of the legs 14 which are later attached or fused to the lower deck panel 12 and upper deck panel 15 during final assembly of the pallet.

Referring to FIG. 5, the blow mold tooling also includes a mold section 55 which opposes the mold section 30 and includes a mold plate 57 rigidly connected to a mold plate 59 with the mold plate 57 supporting a fluid cylinder 62. The mold plate 57 and mold plate 59 are supported by parallel spaced beams 65 which are connected to a hydraulic cylinder (now shown) for movement as a unit for moving the mold sections between an open position (FIGS. 5 & 6) and a closed position (FIGS. 7 & 8). The mold plate 59 is also supported by a peripherally extending frame members 67 and parallel spaced members or rails 69 each having a passage 72 for receiving cooling fluid. A plate 74 is positioned between the plates 57 and 59 and has slots for receiving the support members or rails 69. The plate 74 is connected to the piston of the fluid cylinder 62 and is movable in response to actuation of the cylinder 62 between the plate 57 and plate 59. The plate 74 supports a set of parallel spaced thin blades 75 for movement between extended positions (FIGS. 5-7) projecting through corresponding slots within the plate 59 and retracted positions (FIG. 8) where the bottom ends of the blades 75 are flush with the bottom surface of the plate 59.

During the blow molding process, the air pressure in the parison 16 forms the heated sheet 18 into a cavity 78 within the plate 59 to provide the pallet 10 with a flat solid top surface 80 (FIGS. 1 & 4) surrounding by a peripherally extending vertical wall 82 (FIG. 6) which continues to form a peripherally extending and outwardly projecting horizontal lip or flange 84 for the panel 15. The blades 75 extend outwardly during the forming operation so that the heated sheet 18 forms a double wall rib 90 (FIGS. 5 & 6) around each of the blades 75. Vacuum assist may be used within the mold plate 59 to aid in forming the double wall ribs 90. After the sheet 18 and the sheet 20 have been formed and are still hot and not solidified, the mold section 55 shifts and closes on the mold section 30 (FIG. 7) when the peripheral connected flanges 44 & 84 fuse together, the upper end portions of the open ribs 35 & 37 fuse to the top sheet 18 of the pallet 10, and the lower end portions of the double wall ribs 90 fuse to the lower sheet 35. Also, when the mold sections close, the top walls of the cavities 46 & 48 fuse to the upper sheet 18.

The blades 75 are then retracted (FIG. 8), while the hollow space between the fused together sheets 18 and 20 and surrounding the parallel adjacent side walls of the ribs 90 continues to be pressurized with air so that the adjacent side walls of each rib 90 are fused together, as shown in FIG. 8, to form the closed and fused double wall ribs 90 shown in FIGS. 2, 3, 4 & 8. As also shown in FIGS. 2 & 3, the closed double wall ribs 90 extend transversely or perpendicular to the open ribs 35, and the opposite end portions of the closed double wall ribs 90 are fused to the adjacent side walls of the open ribs 35.

After the upper deck panel 15 is formed by the blow molding process, and the panel 15 is removed from the open mold sections 30 & 55, the flat top surface 80 of the upper deck panel 18 is smooth and solid without any cavities. The surface 80 has only linear marks or lines 95 where the blades 75 have been retracted (FIG. 8) to form the closed and fused double wall ribs 90.

From the drawings and the above description, it is apparent that a hollow plastic upper deck panel for a plastic pallet and made in accordance with the invention, provides desirable features and advantages. As one advantage, the arrangement of the downwardly projecting closed double wall ribs 90 within the upper sheet 18 of the pallet deck panel 15 and the crossing open ribs projecting upwardly from the lower sheet 20 with the ribs fused to the opposing sheets, along with the fused peripheral flanges, provides the panel 15 with substantial strength in all directions while minimizing the weight of the panel. In addition, by forming the closed double wall ribs 90 within the sheet 18, the top surface of the panel is essentially solid, which is especially desirable for many uses of a plastic pallet. Also, by fusing the opposite ends of the double wall closed ribs 90 with the side walls of the vacuum-formed open ribs 35, the connected crossing connected ribs add further to the strength of the hollow deck panel 15. By increasing the strength of the hollow deck panel 15 in all directions, the thickness of the sheets 18 and 20 may be reduced depending on the load to be supported, with the result that the weight of the pallet may be reduced for transporting a predetermined load.

While the form of blow molded upper deck panel for a pallet herein described and its method of construction constitute a preferred embodiment of the invention, it is to be understood that the invention is not limited to this precise form of deck panel, and that changes may be made therein without departing from the scope and spirit of the invention as defined in the appended claims.

What is claimed is:

1. A horizontal deck panel adapted for use in a plastic pallet, said panel comprising
   an injection molded tubular extrusion of thermoplastic material and forming a tubular parison having a first sheet of said material integrally connected to a second sheet of said material,
   said tubular parison having opposite edge portions fused together with portions of said second sheet spaced generally parallel to portions of said first sheet,
   said second sheet including a plurality of parallel spaced rows of aligned elongated double wall ribs extending across said second sheet and having opposing ends of adjacent said ribs defining spaces therebetween,
   said double wall ribs in said second sheet projecting upwardly with top portions of said ribs fused to said first sheet to reinforce said deck panel in a first direction,
   said first sheet including a plurality of parallel spaced rows of aligned elongated double wall ribs projecting downwardly between said ribs in said second sheet,
   said double wall ribs in said rows in said first sheet having bottom portions fused to said second sheet,
   said double wall ribs in said rows in said first sheet extending in said spaces defined between said opposing ends of said ribs in said second sheet and perpendicular to said parallel spaced ribs in said second sheet, and
   said elongated double wall ribs in said first sheet having opposite end portions intersecting and fused to center portions of said elongated double wall ribs in said second sheet to reinforce said deck panel in a second direction perpendicular to said first direction.

2. A deck panel as defined in claim 1 and forming an upper deck panel, a lower said deck panel having substantially the same structure as said upper deck panel and spaced below said upper deck panel, said lower said deck panel being inverted with respect to said upper deck panel, said first sheet of said upper deck panel and said first sheet of said lower deck panel each having peripherally spaced annular ribs defining peripherally spaced vertically aligned cavities, and a set of tubular plastic legs projecting into said aligned cavities and connecting said upper deck panel and said lower deck panel to form a plastic pallet.

3. The plastic pallet defined in claim 2 wherein said elongated double wall ribs in said first sheet of each of said upper deck panel and said lower deck panel comprise closed double wall ribs to provide a substantially solid top surface for said upper deck panel and a substantially solid bottom surface for said lower deck panel.

* * * * *